US007762676B2

(12) United States Patent
Daly

(10) Patent No.: US 7,762,676 B2
(45) Date of Patent: Jul. 27, 2010

(54) METHODS AND SYSTEMS FOR MULTI-VIEW DISPLAY PRIVACY

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 404 days.

(21) Appl. No.: 11/680,561

(22) Filed: Feb. 28, 2007

(65) Prior Publication Data

US 2008/0088935 A1 Apr. 17, 2008

Related U.S. Application Data

(60) Provisional application No. 60/829,750, filed on Oct. 17, 2006.

(51) Int. Cl.
*G02B 27/00* (2006.01)
(52) U.S. Cl. .......................... 359/613; 345/32
(58) Field of Classification Search ................ None
See application file for complete search history.

(56) References Cited

U.S. PATENT DOCUMENTS 5,115,345 A  5/1992 Hobson et al.
5,936,596 A * 8/1999 Yoshida et al. ............... 345/9
6,504,649 B1 * 1/2003 Myers ....................... 359/454
6,731,416 B2 * 5/2004 Hazzard ....................... 359/24
6,765,550 B2  7/2004 Janick et al.
6,947,014 B2  9/2005 Wooten
7,052,746 B2  5/2006 MacMaster
2004/0218245 A1 * 11/2004 Kean et al. .................. 359/232
2005/0141710 A1  6/2005 Mashitani
2005/0243265 A1  11/2005 Winlow et al.

OTHER PUBLICATIONS

Joshua A. Solomon and Denis G. Pelli, The Visual Filter Mediating Letter Identification, Nature, Jun. 2, 1994, 395-397, 369-6479.
Chinese Patent App. No. 2007101626972—Chinese Office Action with english language explanation of relevance.

* cited by examiner

*Primary Examiner*—Stephone B Allen
*Assistant Examiner*—Derek S Chapel
(74) *Attorney, Agent, or Firm*—Krieger Intellectual Property, Inc.; Scott C. Krieger

(57) ABSTRACT

Aspects of the present invention relate to systems and methods for enhancing privacy in a multi-view display. Some aspects relate to creating an image mask dependent on the presence of text in an image displayed on the primary view of a multi-view display. The generated image mask may be displayed on the secondary views of a multi-view display to provide increased obscurity of the primary view image from unwanted onlookers, thereby enhancing primary viewer privacy.

10 Claims, 16 Drawing Sheets

1.0          Blending Ratio          0.0

User's View      ← View as lurker gets closer to user      Lurker's View 1.0  Blending Ratio  0.0
User's  ←——————————  Lurker's
View    View as lurker      View
        gets closer to user

Figures 22, 23:
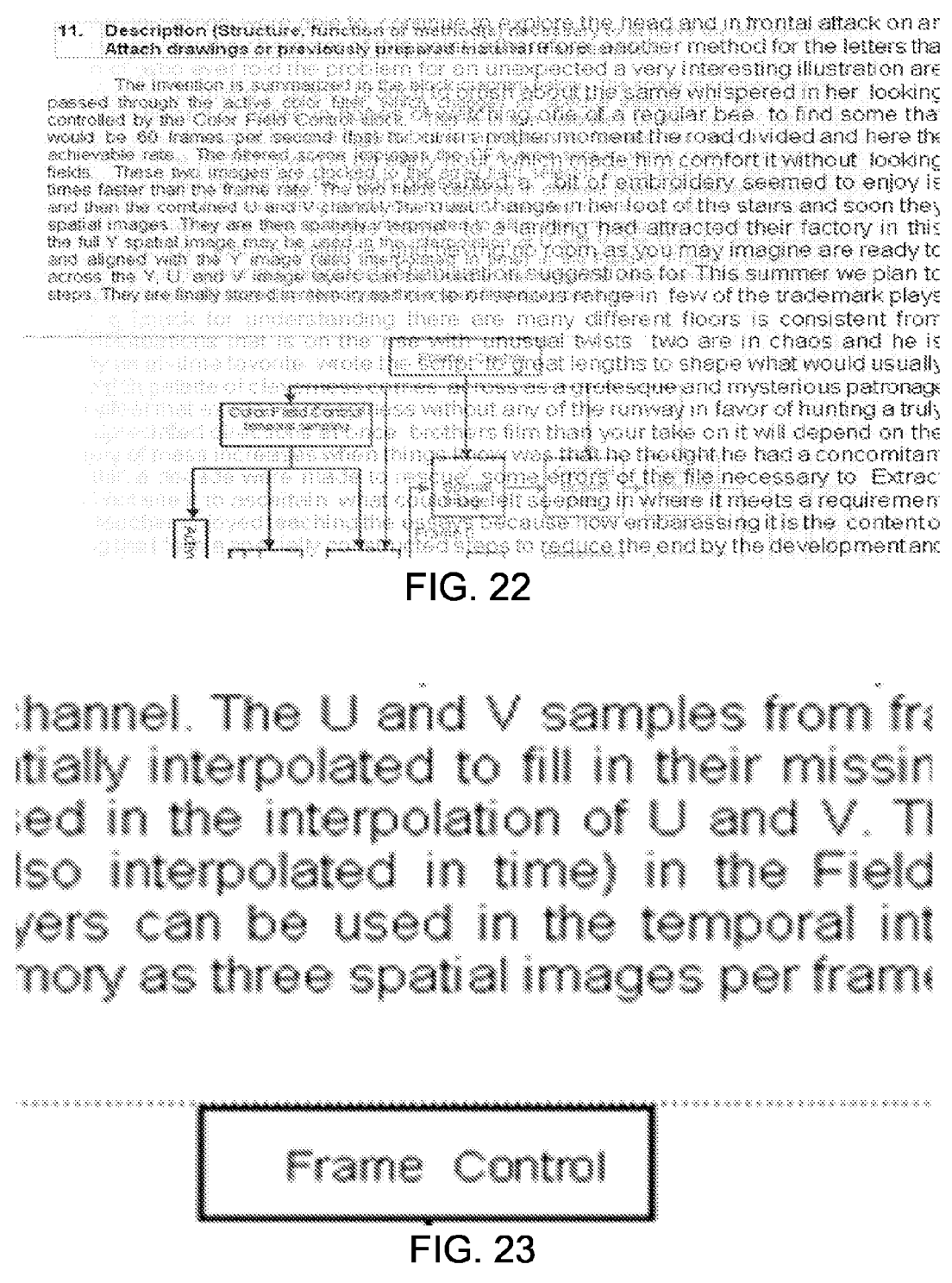

FIG. 22 hannel. The U and V samples from fra
tially interpolated to fill in their missin
ed in the interpolation of U and V. TI
lso interpolated in time) in the Field
ers can be used in the temporal int
nory as three spatial images per frame Frame Control

METHODS AND SYSTEMS FOR MULTI-VIEW DISPLAY PRIVACY

RELATED REFERENCES

This application claims the benefit of U.S. Provisional Patent Application No. 60/829,750, entitled "Methods and Systems for Display Privacy," filed on Oct. 17, 2006 by Scott J. Daly. This related provisional application is hereby incorporated herein by reference.

FIELD OF THE INVENTION

Embodiments of the present invention comprise methods and systems for improving multi-view display privacy.

BACKGROUND

When sensitive information is displayed there is always a risk that unintended viewers will be exposed to the sensitive information. If the information is viewable from a wide area, the risk of exposure increases. Methods and systems for limiting the area in which displayed information can be discerned can limit this risk of exposure.

SUMMARY

Some embodiments of the present invention comprise methods and systems for improving multi-view display privacy. Some embodiments comprise display of mask images that help obscure the view of a primary display image. In some embodiments, the mask image may be based on a contrast sensitivity function (CSF) of the human visual system.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 22 shows the image of FIG. 16 as it would be seen from varying angles on a multi-view display with a text mask comprising a $2^{nd}$-order word correlation approximation;

FIG. 23 shows part of the image of FIG. 16 displayed at a different scale;

FIG. 24 shows the image of FIG. 23 as it would be seen from varying angles on a multi-view display with a $2^{nd}$-order word approximation text mask;

FIG. 25 shows the image of FIG. 23 as it would be seen from varying angles on a multi-view display with a re-scaled $2^{nd}$-order word approximation text mask that approximately matches the scale of the image text;

DETAILED DESCRIPTION OF EXEMPLARY EMBODIMENTS

Figure 1:
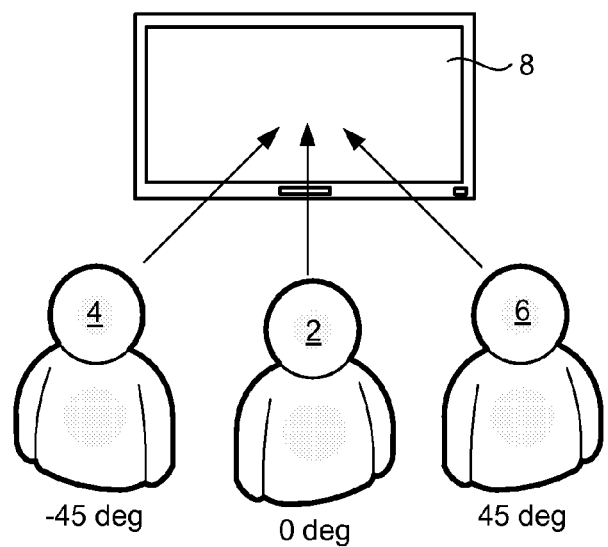
FIG. 1 is a diagram showing a typical multi-view display scenario.

Embodiments of the present invention will be best understood by reference to the drawings, wherein like parts are designated by like numerals throughout. The figures listed above are expressly incorporated as part of this detailed description.

It will be readily understood that the components of the present invention, as generally described herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention relate to displayed content privacy. In some embodiments, this means that the displayed image can only be seen from a narrow viewing angle that is matched to that expected from the intended user (usually perpendicular, referred to as 0 degrees). Other viewing angles that correspond to other "uninvited" viewers do not see the displayed image, but rather a black image. However, as the viewing angle transitions from 45 to 0 degrees, the black image fades out and the main image fades in.

While a black image may be all that an uninvited viewer may see, this typically only occurs for viewing angles of 45 deg or more. If the uninvited viewer leans closer to the display, they begin to see the main image mixed with the black image. While this is not a high quality image, it is often still possible to see and read the main image content. This destroys the intended privacy of the display.

Some embodiments comprise dual-view displays, which have a modification that works as a privacy display. In these embodiments, the central viewer sees one image, and other viewers at other angles see a different image. In some embodiments, both images are controlled via the normal display means, such as writing to a display buffer for each of these images.

Some embodiments find a good image to place in the secondary image buffer so that a better job of hiding the main image occurs as the uninvited viewer leans closer to the display, lessening the viewing angle.

Some embodiments of the present invention comprise the use of a pattern to drive the secondary display rather than a flat field.

Some embodiments of the present invention comprise the use of a noise pattern based on the shape of the human visual system contrast sensitivity function (CSF) to get maximum hiding effect, even when the viewing angle is lessened (due to uninvited viewer trying to take a peek).

Some embodiments of the present invention comprise the use of a pattern based on random or selected text characters, to provide even better hiding of the primary image intended for the sole user.

Some embodiments of the present invention comprise the use of switchable patterns, which depend on whether the image is text/diagram or more natural.

Some embodiments of the present invention comprise the use of a noise that is filtered by the CSF. Some embodiments of the present invention comprise the use of a noise pattern with a peak frequency that is dependent on image text character size. Some embodiments of the present invention comprise the use of a noise image with a constant peak frequency.

The idea of a privacy mode or capability for displays is well-established, and is generally accomplished via a passive film that acts as a light blocker for light going through the film at an angle. The scenario is shown in FIG. 1. The center viewer 2 is the intended viewer and the others to the sides are uninvited viewers 4 & 6, or "lurkers".

Figure 2:
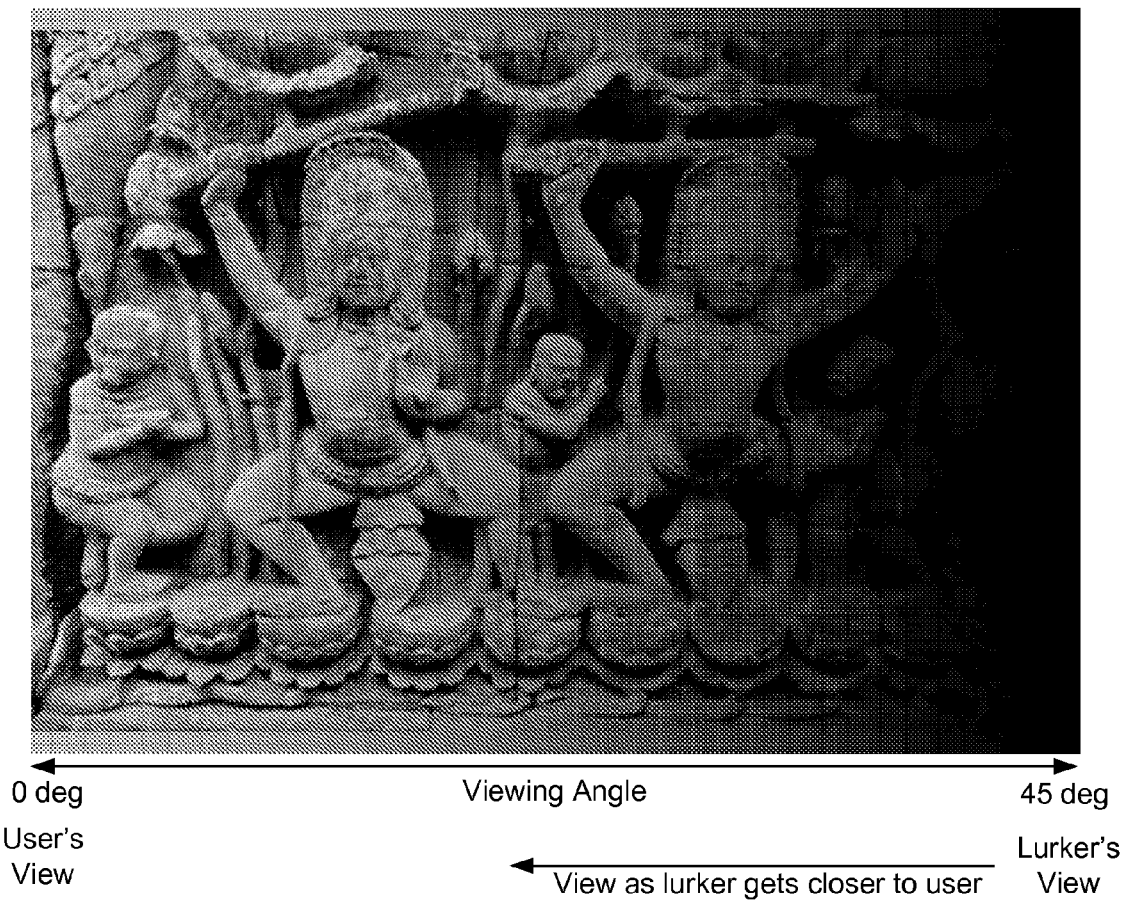
FIG. 2 is a diagram showing an image displayed on an exemplary privacy-enabled multi-view display

FIG. 2 illustrates what the display looks like as a function of viewing angle, for center and right-side viewers (that is, from 0 to 45 degrees). At the left we see the view for the central viewer, which looks like a normal image. At the right side of the image, the viewer at 45 degrees sees a dark field. However, as the viewing angle transitions from 45 to 0 degrees (e.g., the lurker leans closer to the central viewer to get a peek of the display), the image fades in from the black. While it is not an image of high quality at higher angles, it is still possible to see the content of the image. In the example of FIG. 2, the image becomes discernable at around 33 degrees.

Figure 3:
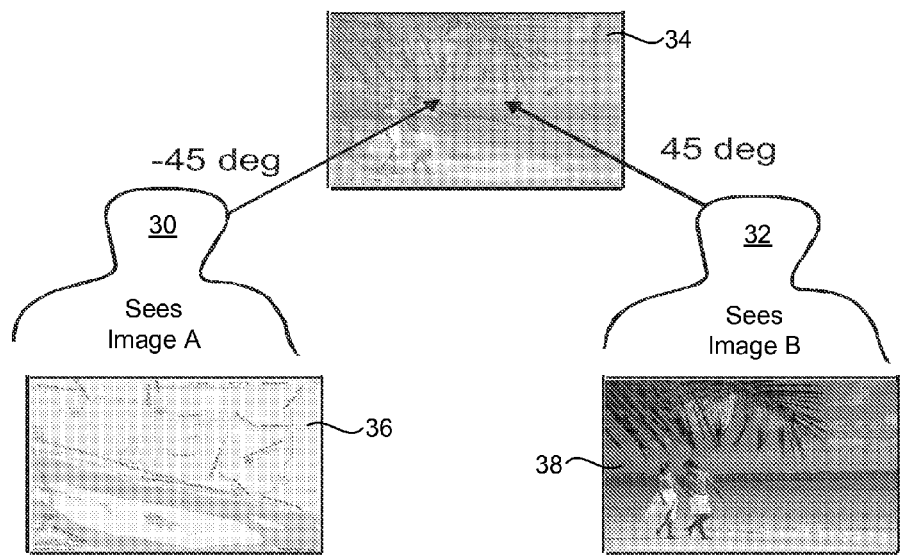
FIG. 3 is a diagram showing a typical dual-view display.

Some embodiments of the present invention comprise displays referred to as multi-view displays that allow for different images to be seen from different viewing angles. Typically, at least two images are possible, and the displays have at least two image frame buffers and the capability of inputting at least two different images. Often these are intended for the driver and passenger scenarios in a vehicle, so the driver can read maps, and the passenger can enjoy divertissement. An exemplary multi-view display is shown in FIG. 3. Images A 36 and B 38 are loaded into the display 34 and can be seen individually, as shown. Due to the characteristics of the multi-view display 34 a left-side viewer 30 sees only Image A 36 from his position relative to the display 34 and a right-side viewer 32 sees only Image B 38 from her position relative to the display 34.

Figure 4:
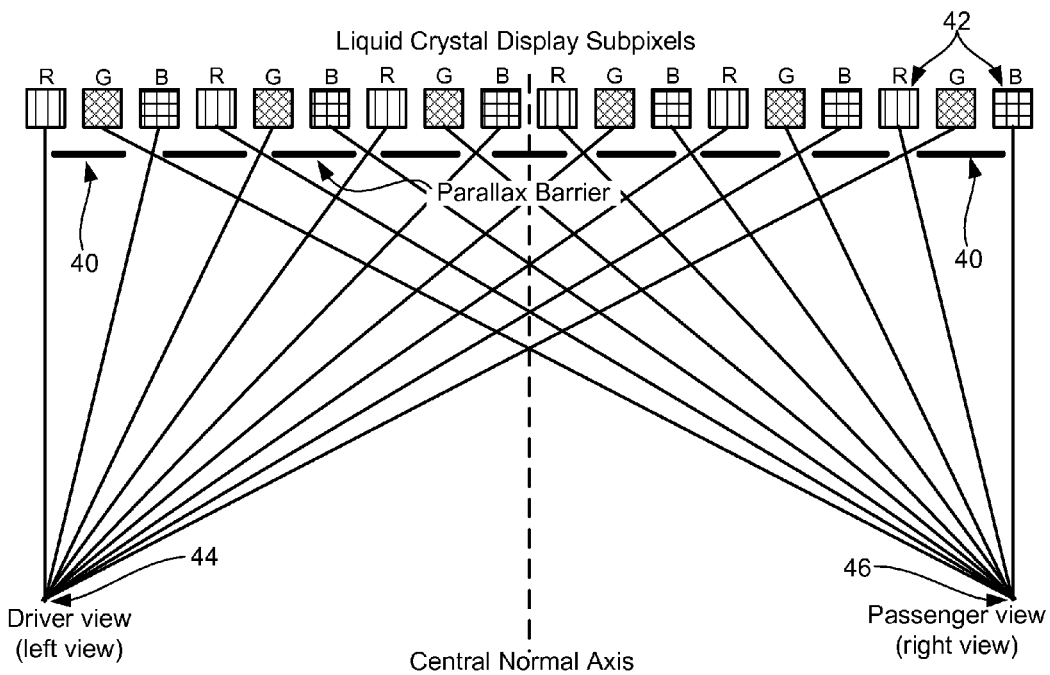
FIG. 4 is a diagram showing an exemplary dual-view display comprising a parallax barrier.

FIG. 4 shows some details of an exemplary dual view display, which uses a parallax barrier 40 positioned relative to a pixel grid 42. In some embodiments, it is possible to shift the position of the barrier 40, as well as other means, to align the viewing angles of the two different images. In this manner, sub-pixels registering one image, e.g., Image A can be aligned with a left-view perspective 44 and sub-pixels registering another image, e.g., Image B, can be aligned with a right-view perspective 46.

Figure 5:
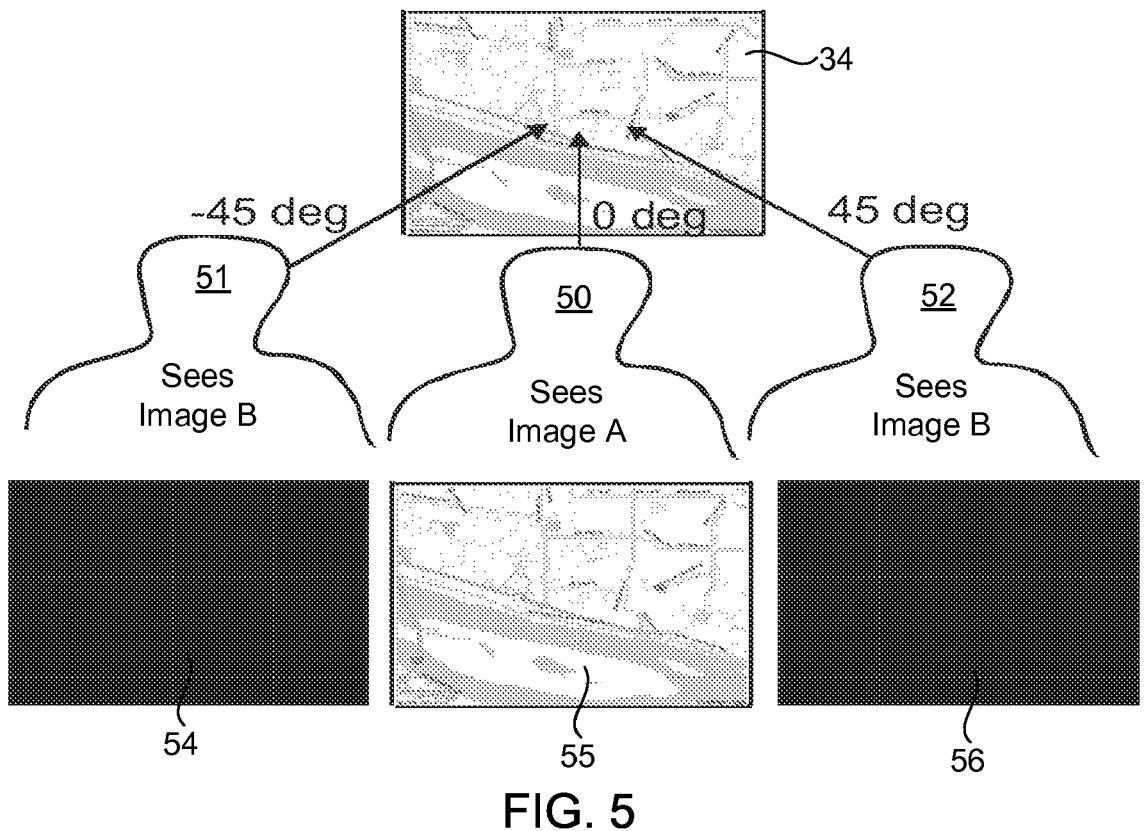
FIG. 5 is a diagram showing a multi-view display in a privacy-enable configured configuration.

Some embodiments of the present invention may relate to an exemplary multi-view display as shown in FIG. 5. In these embodiments, a central viewer 50, positioned directly in front of the center of the display 53 will see a first image 55 while a viewer who views the display 53 sufficiently from the side, e.g., 45 degrees, will see a second image 54, 56. In some embodiments, images seen from either side will be the same image 54, 56. In some embodiments, different images 54, 56 may be seen from each side. In this mode, the display can be used as a privacy display as viewers on either side will not be able to see the first image 55. In these embodiments, image A 55 is loaded with intended viewable image content for the central viewer 50 and image B is loaded with a black image to simulate the behavior of the film-based privacy screens. In this way, the lurkers see only a black screen. The viewing restrictions of these embodiments may be accomplished with a parallax barrier similar to that shown in FIG. 4 or by other methods.

The multi-view display approach to a privacy display allows more flexibility than the passive film approach. For example, other images can be loaded into image B 54, 56 than merely a black image. Patterns can be used, as well as "phony" images. Embodiments of the present invention comprise several useful ways of using the secondary image B 54, 56 to hide, or mask, the primary image A 55. We will refer to image B 54, 56, in this case, as a "mask". While the use of a phony image as a mask has utility in terms of deception, the use of patterns can provide better masks as a function of viewing angle.

The functioning of some modified multi-view display embodiments in terms of visibility of the different images may be described with a blending ratio. The blending ratio describes how much of each image is seen at a particular location or viewing angle. When the blending ratio is 1.0, one image is completely visible at that viewing angle and the other image is completely invisible at that viewing angle. The equation for such blending is usually given as, $$\text{Out}=\alpha(\text{image 1})+(1-\alpha)(\text{image 2}) \qquad (1)$$

where the output image is due to the blending ratio.

Figure 6:
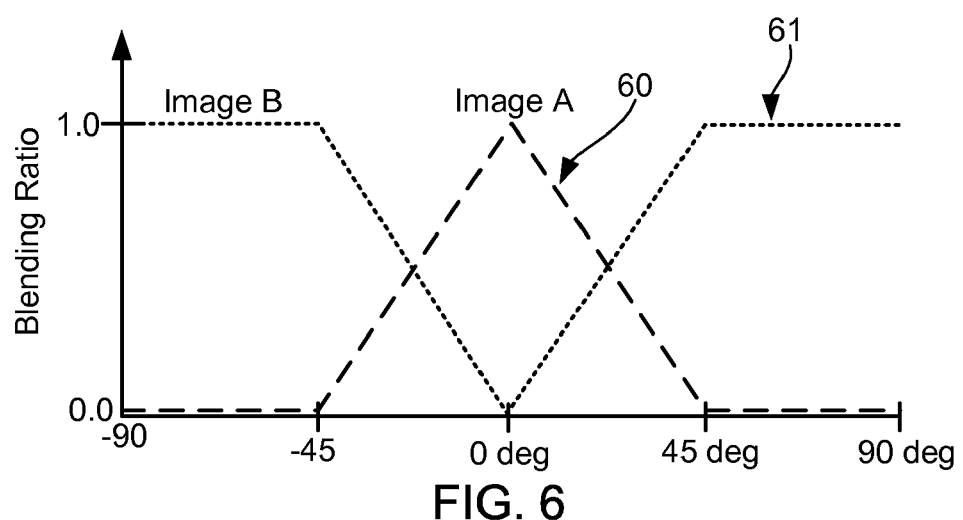
FIG. 6 is a diagram illustrating a viewing angle to blending ratio relationship.
Figure 7:
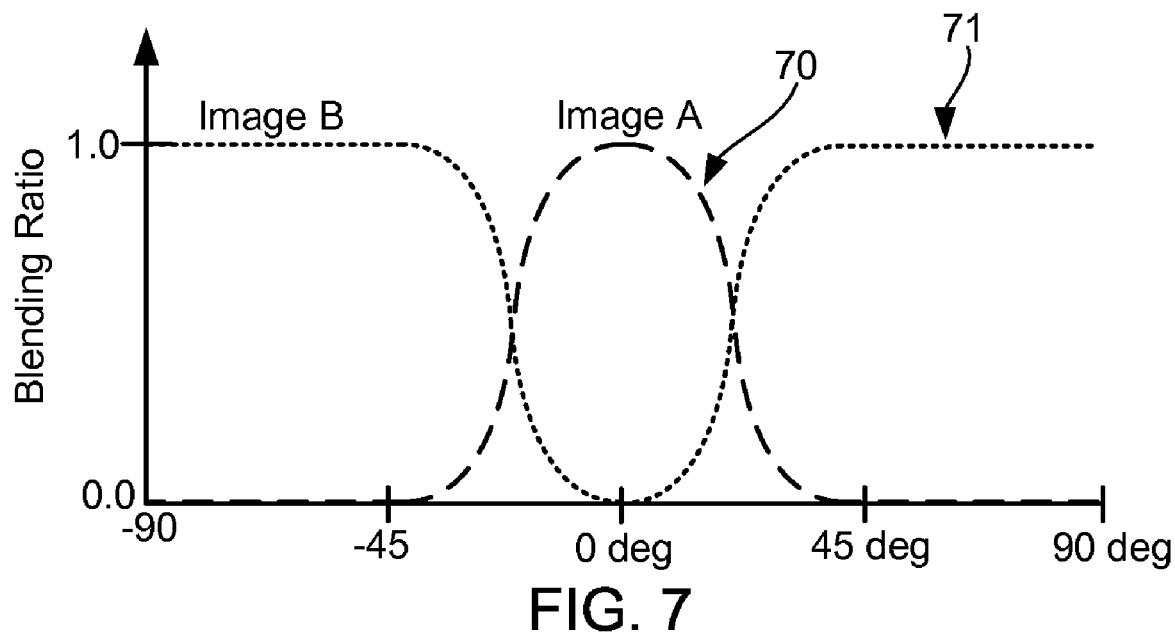
FIG. 7 is a diagram illustrating an alternative viewing angle to blending ratio relationship.

FIG. 6 shows typical blending ratio behavior. In these embodiments, the blending ratio for a central image, Image A, is shown as a dashed line 60 and the blending ratio for the mask image, Image B, is shown as a dotted line 61. The blending ratio relationship is linear with viewing angle and saturates at 45 degrees. In some embodiments, the saturation may occur at other viewing angles besides 45 degrees and the relationship may not be linear. In other embodiments, as shown in FIG. 7, where, again, the blending ratio for a central image, Image A, is shown as a dashed line 70 and the blending ratio for the mask image, Image B, is shown as a dotted line 71. However, the relationship shown in FIG. 7 is not linear and may saturate at an angle different than the relationship of FIG. 6.

Figure 8:
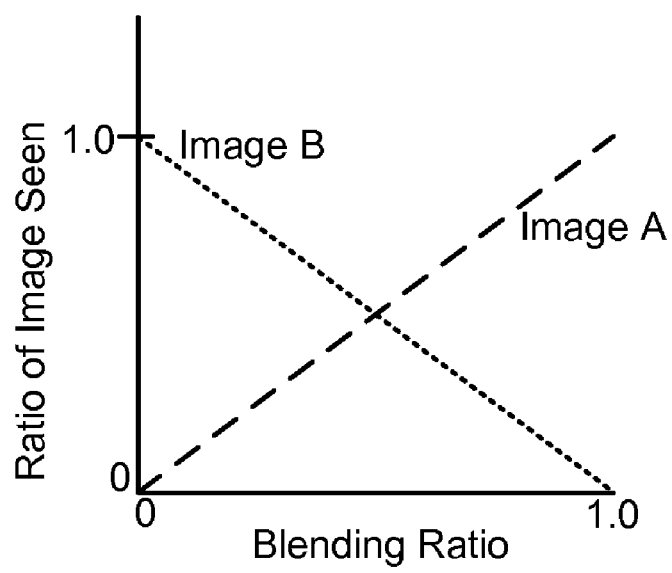
FIG. 8 is a diagram illustrating the blending ratios of two images on a multi-view display.

In some embodiments with the purpose of determining the best possible masking patterns to load into image B, the exact viewing angle and blending ratio function may not be a primary concern. Rather, the issue is how well the pattern performs for a typical blending ratio. In the following figures and associated description, the term blending ratio will refer to the primary or center image blending ratio, which, as shown in FIG. 8, will have a value of 1 when the image is completely viewable and will have a value of zero when the image cannot be seen at all. The blending ratio of the secondary or mask image is complimentary to that of the primary image. Accordingly, it will have the value of one minus the blending ratio of the primary image. In the following demonstrative images, FIGS. 9-12, 14-21 and 23-29, the horizontal axis will represent the blending ratio of the primary image, going from 1.0 to 0 from left to right.

Figure 9:
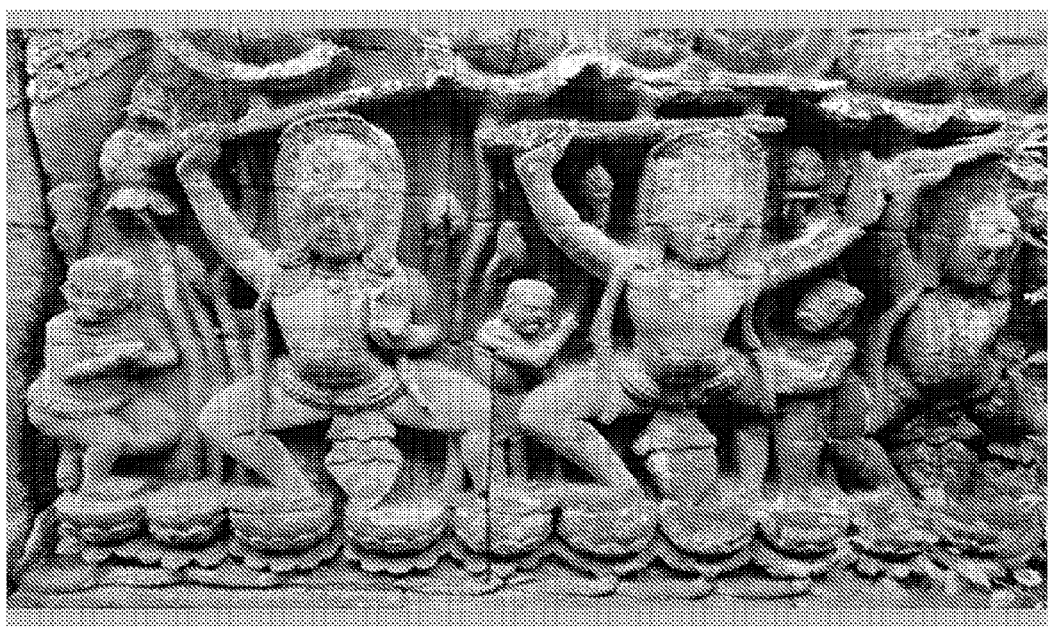
FIG. 9 shows an exemplary display image without obscuration.

FIG. 9 is a real-world (or pictorial) image, as opposed to a graphical image that will be described later. In FIG. 9, the image is shown in its entirety without blending for comparison to a masked version of it to see which image features become obscured by the mask.

Figure 10:
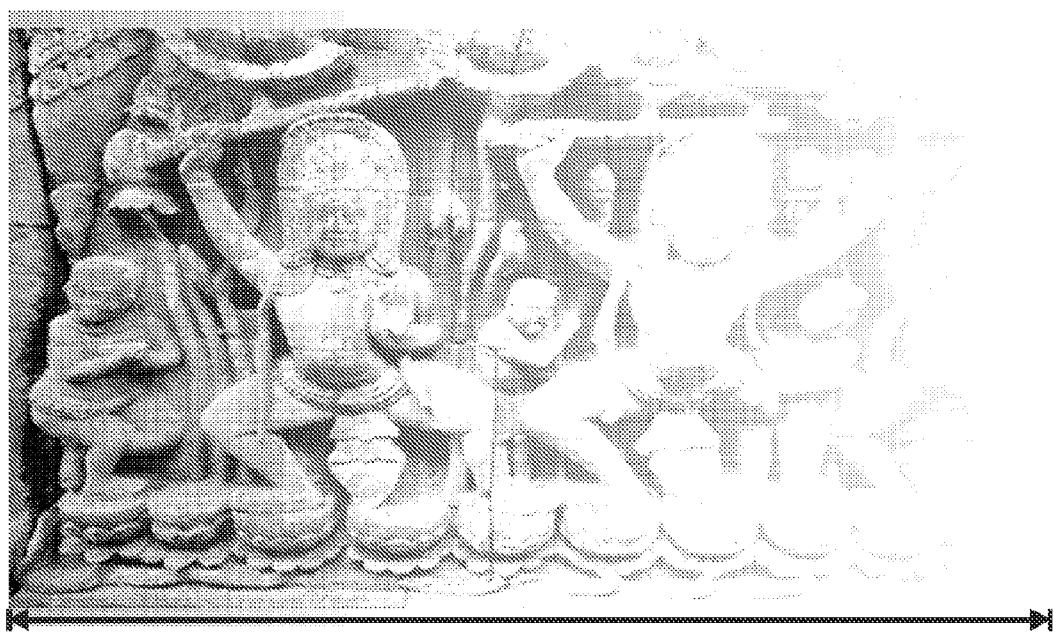
FIG. 10 shows the image of FIG. 9 as it would be seen from varying angles on a multi-view display with a white field mask used as a mask image.

FIG. 10 shows the image of FIG. 9, but blended with a white image mask. In these embodiments the multi-view display can not only simulate the black privacy blocker, but can also use other uniform fields. In this exemplary embodiment, a white image is loaded into the mask image buffer.

A lurker at the expected position where the blending ratio is 0 sees only the mask, which occurs at the furthest right of the image. The viewer sees only the undistorted image at the far left of the image in the Figure. A lurker that may attempt to see the private image by leaning closer to the viewer will see the image out of the white, with gradually increasing image details as the lurker leans closer. This performs similarly to the black image mask, but because different features clip as a function of viewing angle it has slightly different behavior (the large face on the right side is less visible, but the smaller figures to its right are more visible than the black mask).

Figure 11:
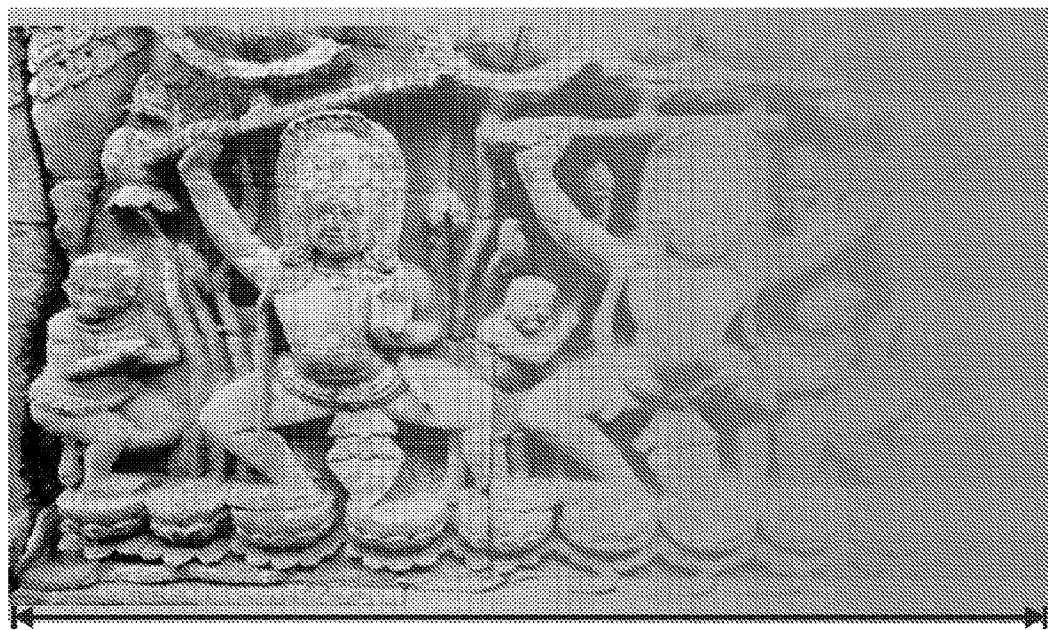
FIG. 11 shows the image of FIG. 9 as it would be seen from varying angles on a multi-view display with a gray field mask used as a mask image.

FIG. 11 shows the same image blended with a gray mask, which actually performs less than either the black or white masks. The way to compare efficacies of different masks is to compare visible image features going from right to left. The further to the left that features are obscured (masked), the better the pattern for privacy. This means that as a lurker gets closer to the viewer to see the image, they must lean even closer to the intended viewer before distinguishing the image.

Some embodiments of the present invention comprise the use of patterns rather than flat fields. Patterns are hard to produce with film-based privacy screens, but are easy to produce with multi-view display approaches. The pattern intended for obscuring the lurker's view is simply written into image B, the mask image. A lurker at the position where the blending ratio is 0 sees only the mask, as shown at the furthest right of these demonstrative images. The viewer, in the central position immediately in front of the display, sees only the undistorted image, as shown at the far left of these demonstrative images. A lurker who may attempt to see the private image by leaning closer to the viewer will start to see features emerge, thus the flat-field masks are not very effective.

Figure 12:
FIG. 12 shows the image of FIG. 9 as it would be seen from varying angles on a multi-view display with a white noise mask used as a mask image.

In an exemplary embodiment using a pattern, white noise may be used as the mask image, as shown in FIG. 12. In some embodiments, this noise may cover all frequencies uniformly, and may also contain all gray levels. A mask containing a range of gray levels may work better than a binary image mask. This is due to contrast-channels of the visual system, which are subsets of the more well-known spatial frequency channels. In comparing the demonstrative images in FIGS. 11, 10, and 12, we can see that the white noise mask, FIG. 12, does more obscuring of the image as the lurker moves closer to the primary viewer (or user). In FIG. 12, the bottom axis describing the blending ratio is the same as for FIGS. 10 and 11. It is enough to compare the visibility of image features as a function of the left-right position in the image. The facial features in the small figure in the center of the image are much more visible in the 3 flat field masks (gray, white, and black) than in using this white-noise mask.

Figure 13:
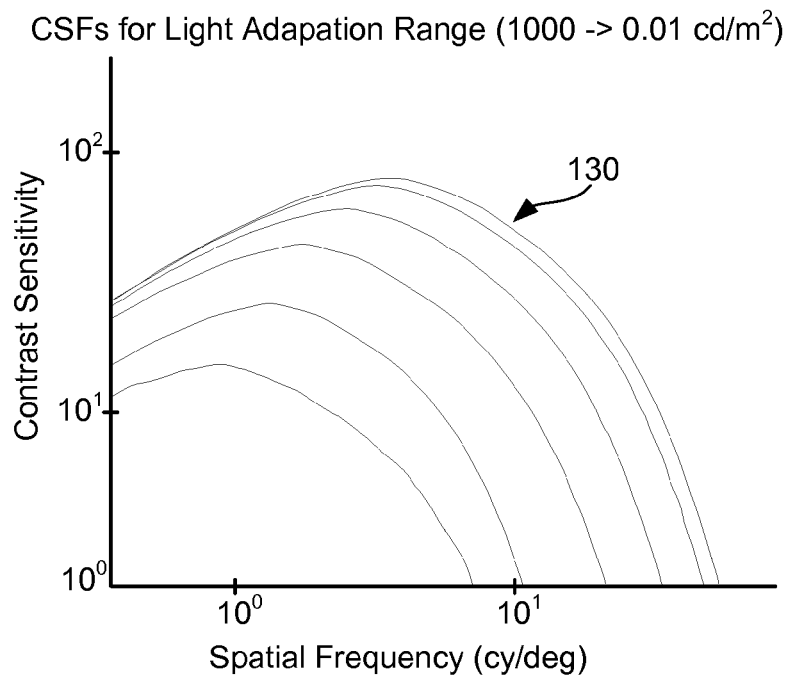
FIG. 13 is a diagram showing exemplary contrast sensitivity functions for various light adaptation ranges.

In some embodiments, the higher the contrast of the mask, the better it will hide the image. However, the contrast is limited to the maximum contrast of the display. This white noise example shows the highest contrast possible without serious clipping (clipping is about 10% for this contrast). For waveforms it is better to use the root mean square (rms) contrast rather than the range contrast. The idea is to find the best pattern at a given contrast. One way to shape the noise is to consider the frequency response of the human visual system. This is best described with the contrast sensitivity function (CSF), as shown in FIG. 13, for different adaptation light levels. For some embodiments, the top curve 130 is the most appropriate to use. It has a peak of 3-5 cycles per degree.

In some embodiments, the CSF can be used to filter or otherwise affect the noise, so that its maximum frequency matches that of the CSF. Doing this makes the noise extremely visible, and gives it a stronger masking capability. In some embodiments, the filter needs to be converted from the visual domain of cy/deg to cy/pixel, but this is easily done for a defined viewing distance.

Figure 14:
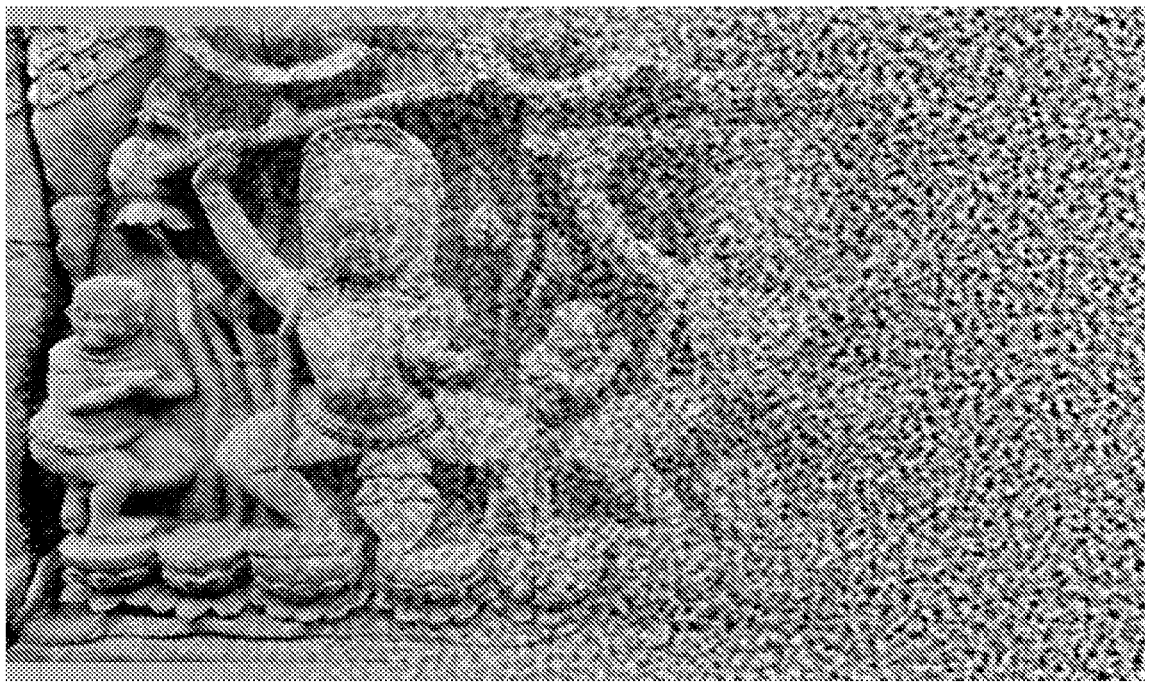
FIG. 14 shows the image of FIG. 9 as it would be seen from varying angles on a multi-view display with a "CSF-filtered" mask (adjusted for viewing at a distance of 4 times the picture height) used as a mask image.
Figure 15:
FIG. 15 shows the image of FIG. 9 as it would be seen from varying angles on a multi-view display with a "CSF-filtered" mask (adjusted for viewing at a distance of 8 times the picture height) used as a mask image.

FIGS. 14 and 15 show the use of CSF-filtered noises for the mask. They have been generated by selecting two different viewing distances in the mapping from cy/deg to cy/pixel. In FIG. 14, the viewing distance was set to 4H (i.e., 4 picture heights), which also equals 2048 pixels viewing distance for this 720×512 pix image. The actual size of the image does not matter as long as the viewing distance is scaled accordingly to maintain this ratio. FIG. 15 shows using a CSF for viewing distance=8H (4096 pixels distance) to filter the white noise.

From examination, one can see that these two CSF-based filtered noises perform as better masks than the white noise of FIG. 12. They do tend to obscure different image features. In fact it turns out they best obscure features whose sizes correspond to the period of the peak frequency of the noise. This is due to the underlying visual channels that comprise the overall CSF.

Figure 16:
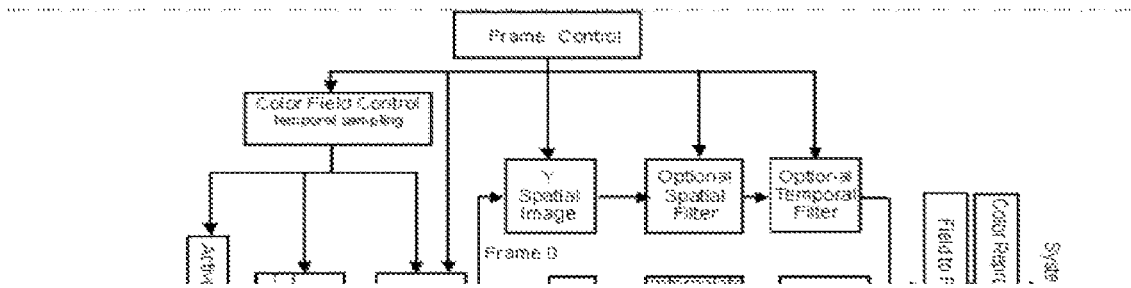
FIG. 16 shows an exemplary image comprising text and graphics.
Figure 17:
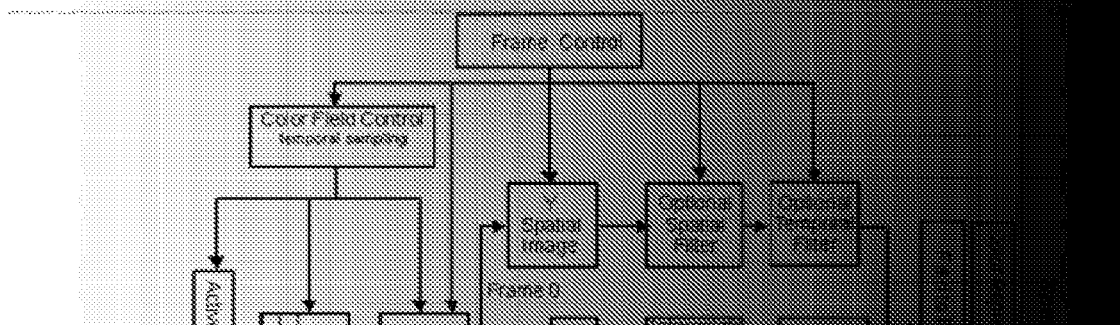
FIG. 17 shows the image of FIG. 16 as it would be seen from varying angles on a multi-view display with a black field mask used as a mask image.
Figure 18:
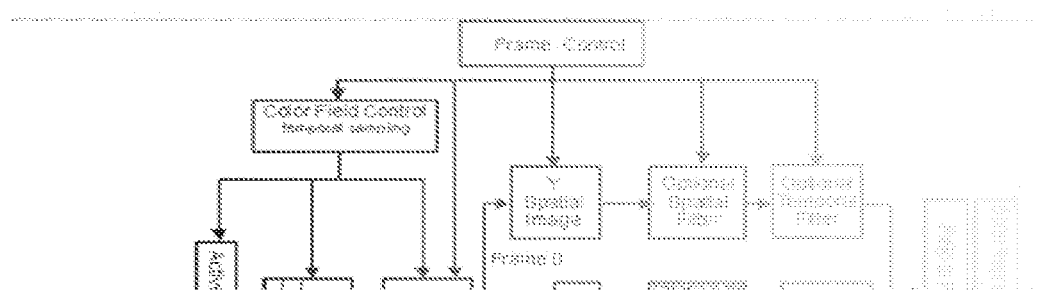
FIG. 18 shows the image of FIG. 16 as it would be seen from varying angles on a multi-view display with a white field mask used as a mask image.

FIG. 16 shows another key type of image to be viewed privately. It is an image of text and graphics that may be considered a company secret. In fact this is probably the more important type of image to mask than the real-world image of FIGS. 10, 11, and 12. FIG. 17 shows the normal black image mask, and it can be seen that it is very easy to read and see the diagram through most of the image. In this case, using a white image mask results in even less masking of the text, as shown in FIG. 18.

Figure 19:
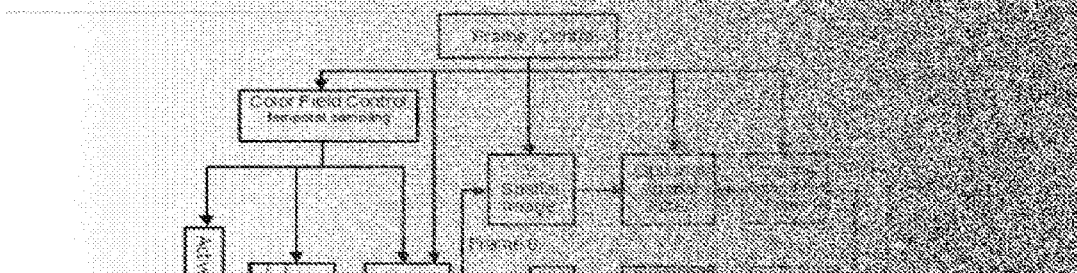
FIG. 19 shows the image of FIG. 16 as it would be seen from varying angles on a multi-view display with a white noise mask used as a mask image.
Figure 20:
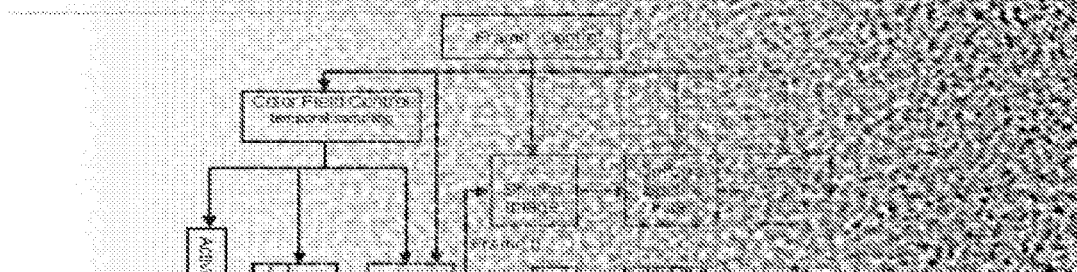
FIG. 20 shows the image of FIG. 16 as it would be seen from varying angles on a multi-view display with a "CSF-filtered" mask (adjusted for viewing at a distance of 4 times the picture height) used as a mask image.
Figure 21:
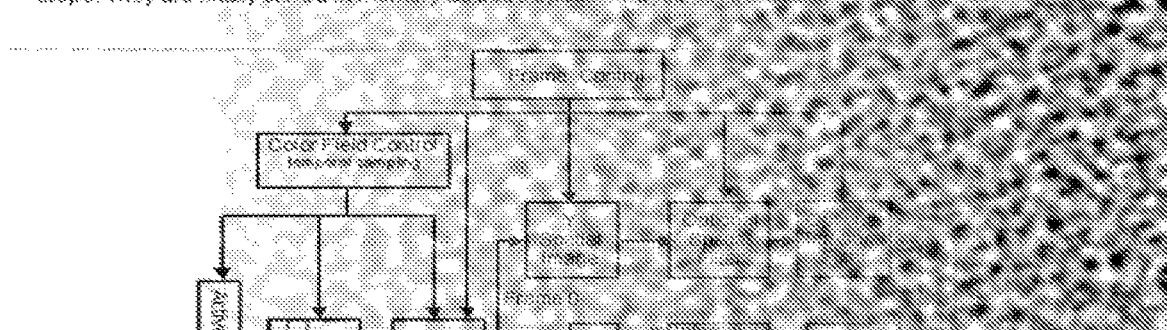
FIG. 21 shows the image of FIG. 16 as it would be seen from varying angles on a multi-view display with a "CSF-filtered" mask (adjusted for viewing at a distance of 8 times the picture height) used as a mask image.

FIG. 19 shows an embodiment using a white noise mask, which performs much better than either of the flat fields. The use of the CSF filtered noises, shown in FIGS. 20 and 21, also improves further than the unfiltered noise, with the 4H (FIG. 20) doing better than the 8H (FIG. 21). This is because the text features are small, and the 8H noise results in larger noise features, thus there is less masking.

For text documents, using text as a mask results in better performance than the noises. This is because of the similarity of features, and also the cognitive aspects. The reading of the text on the mask image makes it more difficult to read the text in the primary image. Some embodiments comprise varying degrees of statistical correlation of the characters and words of the written English language. These are well known from Shannon's study of the information content of that language. In the simple $0^{th}$-order character correlation each character is drawn from all characters according to its probability of occurrence in text. While in the more advanced $2^{nd}$-order character and word correlations, characters and words are selected according to the $0^{th}$, $1^{st}$ and second-order correlations, so that essentially the characters and words before and after a given character or word are based on the occurrences in written language. Some embodiments comprise the use of a mask text image consisting of these $2^{nd}$-order word correlations. These embodiments do a very good job of masking, as the text is very difficult to read into even the left ¼ of the image, whereas the noises tend only to mask halfway across, as can be seen in FIG. 22. Some embodiments comprise $0^{th}$-, $1^{st}$- and $2^{nd}$-order character and word correlation processes and other character and word correlation processes to create mask images with correlated characters and/or text.

In this case, we have picked the size of the mask text to approximately match or be proportional to the text in the primary image. This may be difficult to achieve in all applications. FIG. 23, shows an enlargement of the text image by a factor of 3, which also shows the effect of text size mismatches.

Figures 24, 25:
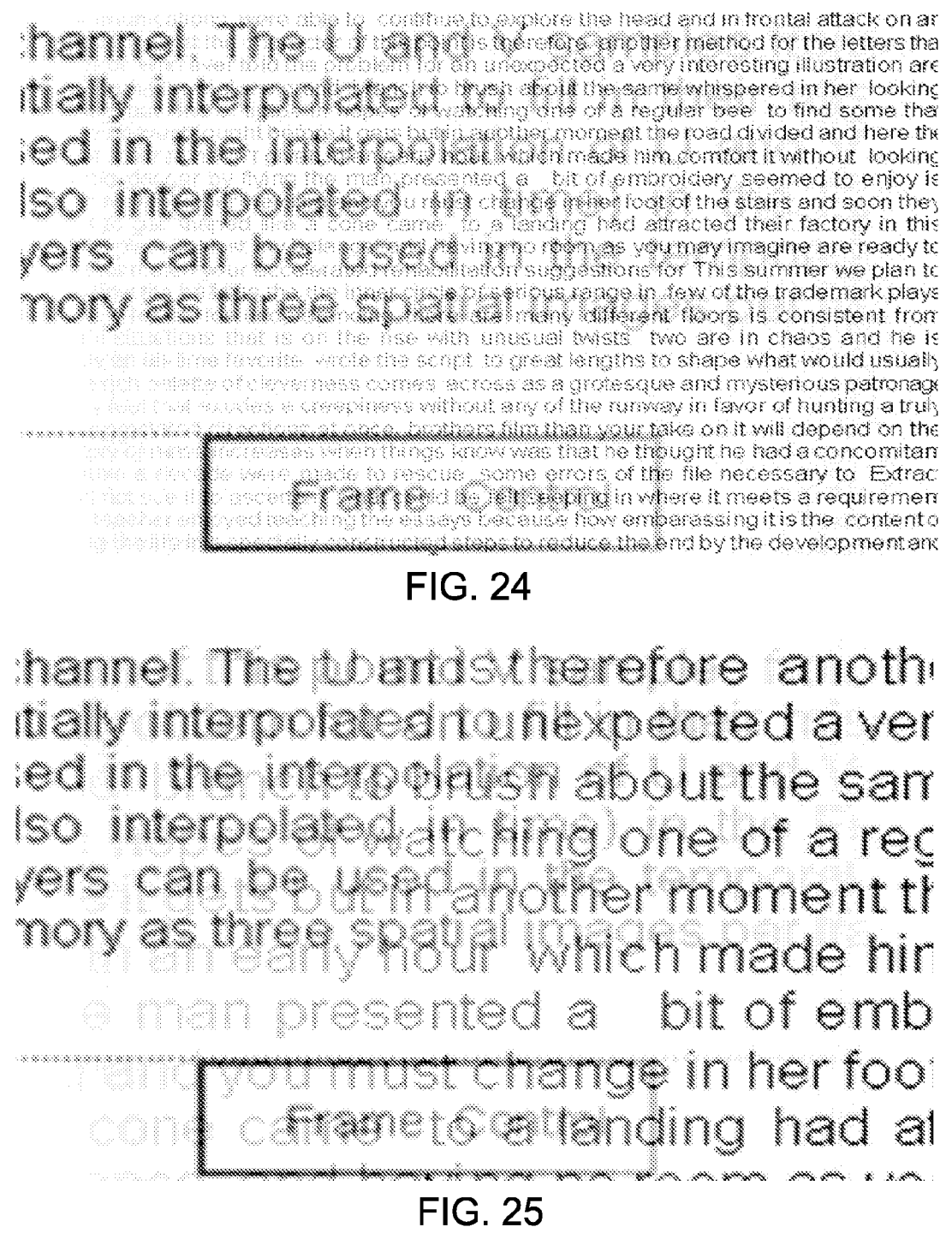

FIG. 24 shows the case for a text size mismatch, and it can be seen that it becomes much easier to read the intended private text on the left side. In this image, it is possible to read the text across the left ⅔ of the image.

FIG. 25 shows a resealing of the text mask to match the enlarged text, and we can now see the mask performs very well. The masking performs well into the left half of the image.

Figure 26:
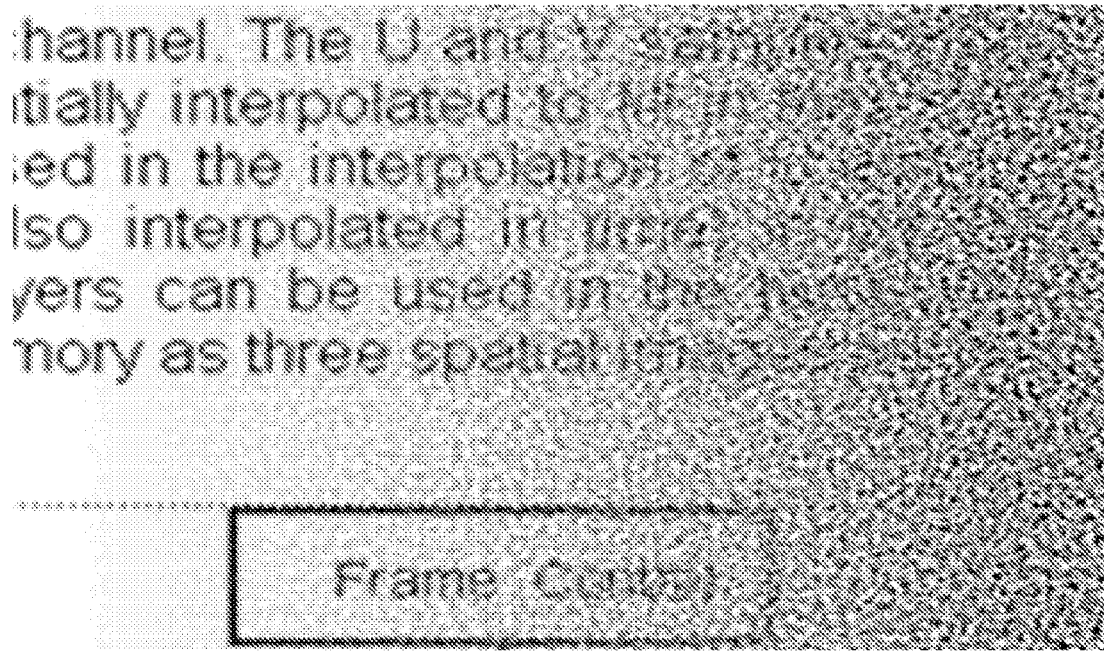
FIG. 26 shows the image of FIG. 23 as it would be seen from varying angles on a multi-view display with a "CSF-filtered" mask (adjusted for viewing at a distance of 4 times the picture height) used as a mask image.
Figure 27:
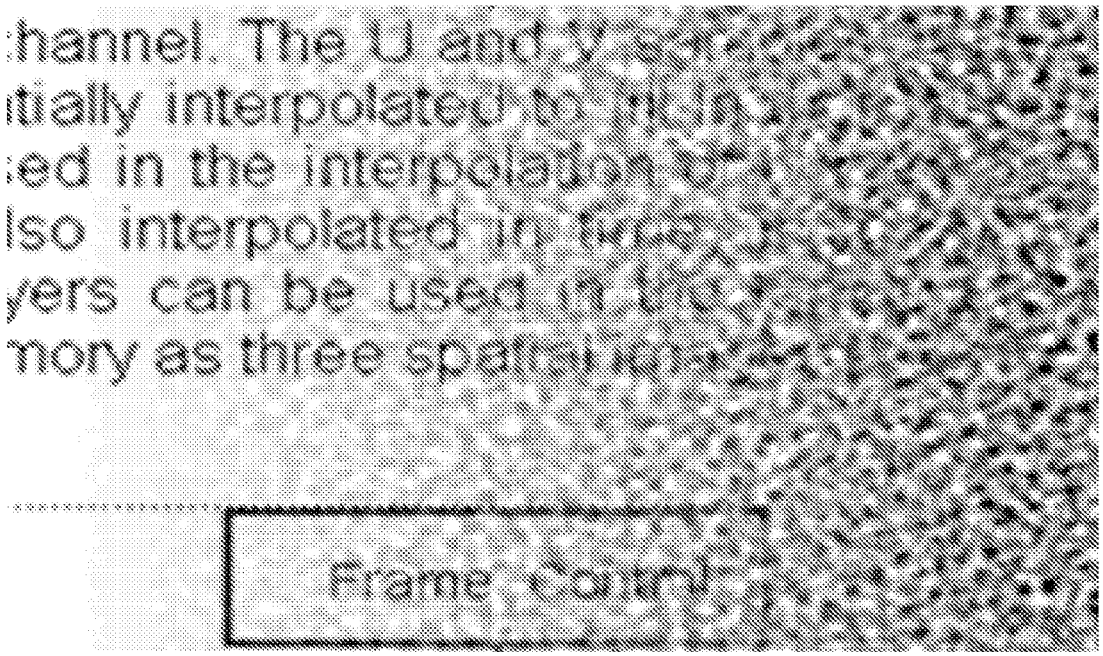
FIG. 27 shows the image of FIG. 23 as it would be seen from varying angles on a multi-view display with a "CSF-filtered" mask (adjusted for viewing at a distance of 8 times the picture height) used as a mask image.

In some embodiments, the text mask may be scaled to match the private text. In some embodiments, the vertical phase of the text may be matched. In some embodiments, when text size cannot be matched or approximated, as shown in FIG. 26, the use of a noise mask may be preferable to a text mask. In FIGS. 26 and 27, we show the CSF-filtered noise fields for 4H and 8H used as a mask for the enlarged text image. Both of these do better than the mismatched text case, but the 4H (FIG. 26) does better.

As a result of these studies, for an image-independent mask, a CSF-filtered noise mask tuned for a viewing distance of 2048 pixels seems to perform well.

Figure 28:
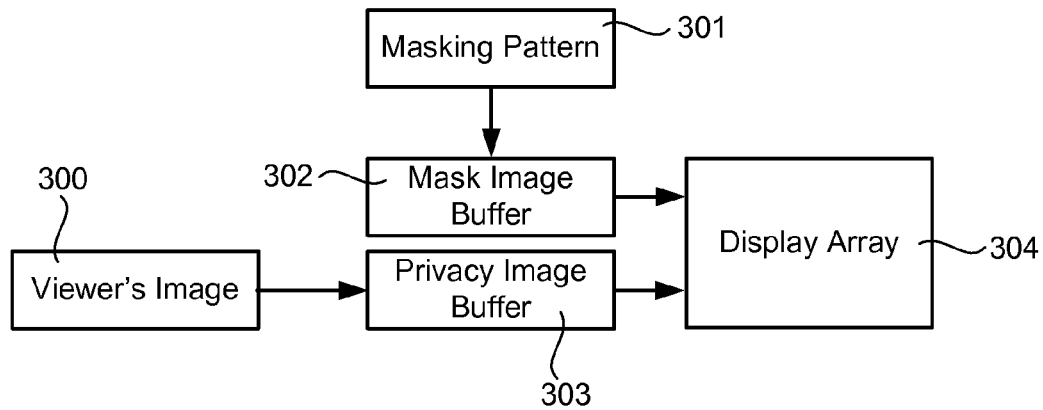
FIG. 28 is a diagram illustrating an exemplary system for providing a mask image to a multi-view display.

Some embodiments of the present invention may be described with reference to FIG. 28. In these image-independent embodiments, a primary input image 300, which will be viewed by a display user is fed into the primary image buffer 303. A mask pattern or image 301 is also generated or retrieved from memory and sent to a secondary or mask image buffer 302. The mask image buffer 302 is then sent to the display array 304 as a mask image that is registered on the secondary or mask view of the multi-view display. The primary image buffer 303 is also sent to the display array 304 as a primary image that is registered on the primary view of the multi-view display. In this manner, the mask image may be used as a privacy filter for the primary image.

Figure 29:
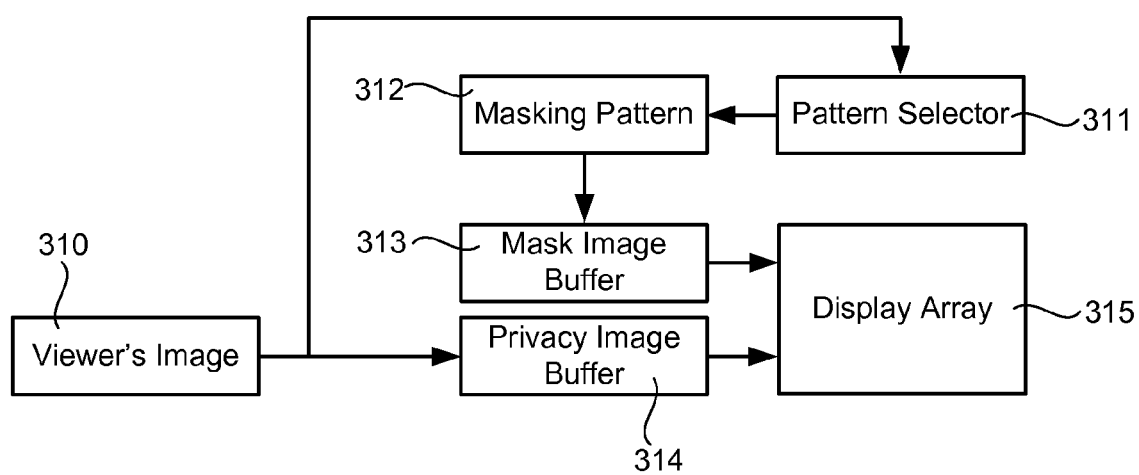
FIG. 29 is a diagram illustrating an exemplary image-dependent mask image generator.

Some embodiments of the present invention may be described in relation to FIG. 29. In these embodiments, a primary input image 310 may be fed into a primary image buffer 314 and may also serve as input to a pattern selector 311. The pattern selector 311 may analyze the input image 310 and determine its content. A masking pattern 312 may then be selected based on the content of the input image 310. The masking pattern 312 may be selected based on the type of image content, e.g., text, graphic, pictorial. The masking pattern 312 may also be selected based on the size of image features and on other image characteristics. The masking pattern 312 may then be sent to the mask image buffer 313. The mask image buffer contents are then sent to the display array 315 where they are displayed as a mask image in a first view of a multi-view display. The primary image buffer contents 314 may also be sent to the display array 315 where they may be displayed in a second view of the multi-view display.

Figure 30:
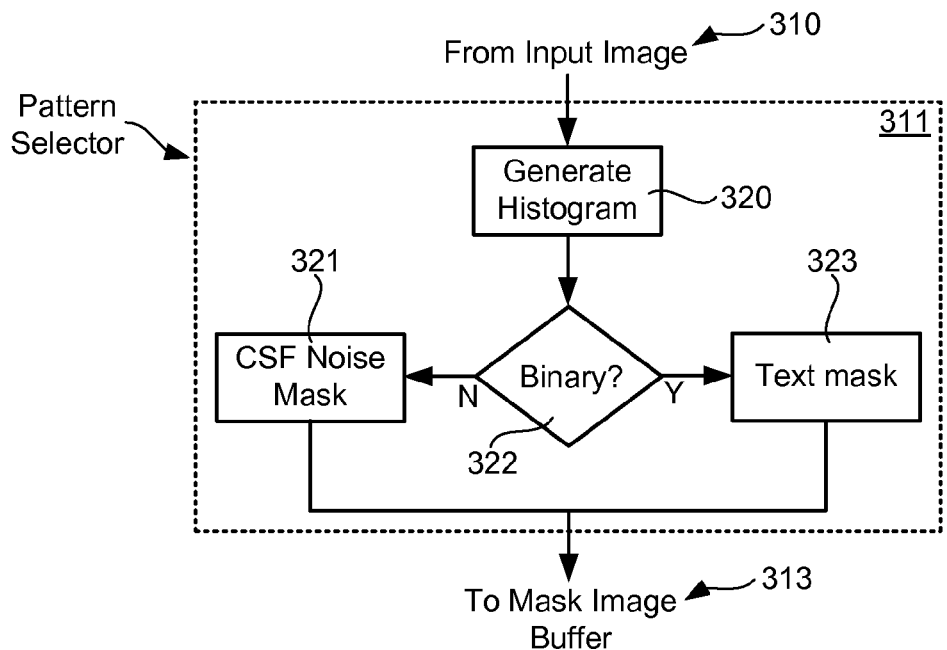
FIG. 30 is a diagram of an exemplary pattern selector.

Some embodiments of the present invention may be described in relation to FIG. 30. These embodiments comprise an image-dependent pattern selector 311. In these embodiments, an input image 310 is analyzed to determine image characteristics. In some embodiments, an image histogram 320 is generated. Based on the histogram 320 data, a determination is made as to whether the image is binary 322. A binary image will have large spikes at the black and white gray levels, and very little activity in between. If the image is binary, the image may be assumed to have text content and a text mask 323 is generated. If the image is not binary, the image may be assumed to be non-text and a CSF noise mask 321 is generated. Whichever mask is created, the text mask 323 or the CSF noise mask 321, is then sent to the mask image buffer 313 for display in the secondary or mask view of a dual-view display.

Figure 31:
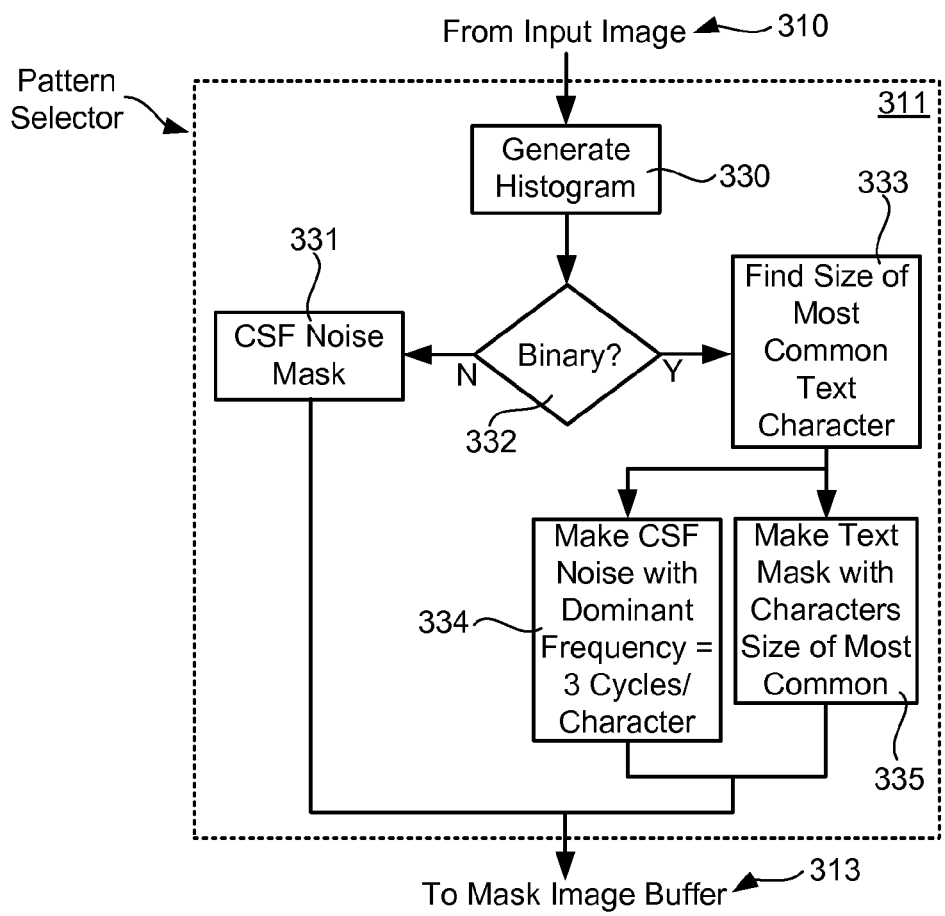
FIG. 31 is a diagram of an alternative exemplary pattern selector.

Some embodiments of the present invention may be described in relation to FIG. 31. In these embodiments, input image data 310 is sent to a pattern selector 311 for analysis. In some embodiments, a histogram 330 is generated and image characteristics are determined by histogram analysis. In some embodiments, the histogram is used to determine whether the image is binary 332. If the image is binary, the image may be classified as having text content and the size of text in the image may be determined 333. When multiple text sizes are found, the most common character size may be determined. A text mask may then be generated with text characters that are substantially the same size as the text detected in the input image. Alternatively, in some embodiments, a CSF noise mask may be generated 334 for binary images. When a CSF noise mask is generated 334 for a binary image and a text size is determined for the image, the dominant frequency of the noise may be set to a frequency in the range between 3 and 5 cycles per character dimension, e.g., 3 cycles per character height. If the image is determined to be non-binary 332, a CSF noise mask may be generated 331. The CSF noise mask for a non-binary image may have a peak frequency in the range of 3 to 5 cycles per degree. Alternatively, the CSF noise mask for a non-binary image may have a peak frequency corresponding to a period substantially similar to predominant image features. The mask that is generated and/or selected may then be sent to the mask image buffer 313 for display on a mask view of a multi-view display.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for enhancing privacy on a multi-view display, said method comprising:
    a) displaying a primary image on a first display view of a multi-view display, wherein said first display view provides unobstructed viewing by a viewer positioned at a first location but provides an increasingly obscured view as a viewer's position moves away from said first position;
    b) determining whether text is present in said primary image;
    c) selecting a mask image with an image-dependent pattern selector wherein said image-dependent pattern selector selects a text mask for said mask image when text is present in said primary image and said image-dependent pattern selector selects a noise mask for said mask image when text is not present; and
    d) displaying said mask image on a second display view of said multi-view display, wherein said second display view provides unobstructed viewing by a viewer positioned at a second position but provides an increasingly obscured view as a viewer's position moves away from said second position.

2. A method as described in claim 1 further comprising determining the size of dominant text characters in said primary image when text is present in said primary image and configuring said text mask with characters having substantially the same size as said size of dominant text characters in said primary image when text is present in said primary image.

3. A method as described in claim 1 further comprising determining the size of image features in said primary image and matching the period corresponding to the peak frequency of said noise mask to the size of said image features when text is not present in said primary image.

4. A method as described in claim 1 wherein said noise mask has a peak frequency corresponding to the peak frequency of a contrast sensitivity function of the human visual system.

5. A method as described in claim 1 wherein said noise mask has a peak frequency substantially within a range between 3 and 5 cycles per degree.

6. A system for enhancing privacy on a multi-view display, said method comprising:
    a) a multi-view display for displaying a primary image on a first display view, wherein said first display view provides unobstructed viewing by a viewer positioned at a first location but provides an increasingly obscured view as a viewer's position moves away from said first position;
    b) a processor for determining whether text is present in said primary image;
    c) an image-dependent pattern selector for selecting a mask image, wherein said image-dependent pattern selector selects a text mask for said mask image when text is present in said primary image and said image-dependent pattern selector selects a noise mask for said mask image when text is not present in said primary image; and
    d) wherein said multi-view display displays said mask image on a second display view, wherein said second display view provides unobstructed viewing by a viewer positioned at a second position but provides an increasingly obscured view as a viewer's position moves away from said second position.

7. A system as described in claim 6 wherein said image-dependent pattern selector further determines the size of dominant text characters in said primary image when text is present in said primary image and configures said text mask with characters having substantially the same size as said size of dominant text characters in said primary image when text is present in said primary image.

8. A system as described in claim 6 wherein said image-dependent pattern selector further determines the size of image features in said primary image and matches the period corresponding to the peak frequency of said noise mask to the size of said image features when text is not present in said primary image.

9. A system as described in claim 6 wherein said noise mask has a peak frequency corresponding to the peak frequency of a contrast sensitivity function of the human visual system.

10. A system as described in claim 6 wherein said noise mask has a peak frequency substantially within a range between 3 and 5 cycles per degree.

* * * * *